(12) United States Patent
Alekseev et al.

(10) Patent No.: US 11,370,960 B2
(45) Date of Patent: Jun. 28, 2022

(54) POLYMER FIBER ADDITIVE FOR PROPPANT FLOWBACK PREVENTION

(71) Applicant: SCHLUMBERGER TECHNOLOGY CORPORATION, Sugar Land, TX (US)

(72) Inventors: Alexey Vladimirovich Alekseev, Novosibirsk (RU); Andrey Vladimirovich Fedorov, Kolsovo (RU); Nikolay Borisovich Gorshkov, Koltsovo (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 16/075,308

(22) PCT Filed: Feb. 4, 2016

(86) PCT No.: PCT/RU2016/000050
§ 371 (c)(1),
(2) Date: Aug. 3, 2018

(87) PCT Pub. No.: WO2017/135840
PCT Pub. Date: Aug. 10, 2017

(65) Prior Publication Data
US 2019/0040308 A1   Feb. 7, 2019

(51) Int. Cl.
*E21B 43/267*   (2006.01)
*C09K 8/80*   (2006.01)
(Continued)

(52) U.S. Cl.
CPC ............ *C09K 8/685* (2013.01); *C09K 8/68* (2013.01); *C09K 8/70* (2013.01); *C09K 8/80* (2013.01);
(Continued)

(58) Field of Classification Search
CPC ......... E21B 43/26; E21B 43/267; C09K 8/80; C09K 8/805
See application file for complete search history.

(56) References Cited

U.S. PATENT DOCUMENTS 5,501,275 A   3/1996   Card et al.
5,775,425 A   7/1998   Weaver et al.
(Continued)

FOREIGN PATENT DOCUMENTS

EP   0735235 B1   10/2000
RU   2435823 C1   12/2011
(Continued)

OTHER PUBLICATIONS

RU 2435823 translation, retrieved Jan. 6, 2021 from https://patents.google.com/patent/RU2435823C1/en?oq=ru+2435823 (Year: 2021).*
(Continued)

*Primary Examiner* — Angela M DiTrani Leff

(57) ABSTRACT

A method for fracturing a subterranean formation, the method comprising injecting a fracturing fluid into a wellbore through the subterranean formation, thereby creating a fracture network in the subterranean formation, the fracturing fluid comprising a proppant and a plurality of polymer fibers having a deflection temperature ranging from about 70° C. to about 150° C. dispersed in a carrier fluid.

13 Claims, 10 Drawing Sheets

(51) Int. Cl.
*C09K 8/68* (2006.01)
*C09K 8/92* (2006.01)
*C09K 8/88* (2006.01)
*C09K 8/70* (2006.01)

(52) U.S. Cl.
CPC .................. *C09K 8/88* (2013.01); *C09K 8/92* (2013.01); *E21B 43/267* (2013.01); *C09K 2208/08* (2013.01)

(56) References Cited

U.S. PATENT DOCUMENTS

| | | | |
|---|---|---|---|
| 5,787,986 A | 8/1998 | Weaver et al. | |
| 5,839,510 A | 11/1998 | Weaver et al. | |
| 5,853,048 A | 12/1998 | Weaver et al. | |
| 5,871,049 A | 2/1999 | Weaver et al. | |
| 6,047,772 A | 4/2000 | Weaver et al. | |
| 6,172,011 B1 | 1/2001 | Card et al. | |
| 6,209,643 B1 | 4/2001 | Nguyen et al. | |
| 6,439,309 B1 | 8/2002 | Matherly et al. | |
| 6,742,590 B1 | 6/2004 | Nguyen | |
| 6,892,813 B2 | 5/2005 | Nguyen et al. | |
| 6,962,200 B2 | 11/2005 | Nguyen et al. | |
| 7,032,667 B2 | 4/2006 | Nguyen et al. | |
| 7,806,181 B2 | 10/2010 | Barmatov et al. | |
| 2004/0014608 A1* | 1/2004 | Nguyen | C09K 8/706 507/200 |
| 2004/0149441 A1 | 8/2004 | Nguyen et al. | |
| 2005/0051332 A1 | 3/2005 | Nguyen et al. | |
| 2005/0145385 A1 | 7/2005 | Nguyen | |
| 2006/0035790 A1* | 2/2006 | Okell | C09K 8/805 507/269 |
| 2006/0229395 A1* | 10/2006 | Hsu | C08K 5/098 524/394 |
| 2007/0066491 A1* | 3/2007 | Bicerano | C09K 8/24 507/117 |
| 2008/0115936 A1 | 5/2008 | Barmatov et al. | |
| 2010/0263870 A1* | 10/2010 | Willberg | E21B 43/04 166/305.1 |
| 2011/0114313 A1* | 5/2011 | Lesko | C09K 8/665 166/280.1 |
| 2011/0136943 A1* | 6/2011 | James | C09K 8/467 524/5 |
| 2013/0112409 A1* | 5/2013 | Baleno | C09K 8/68 166/278 |
| 2014/0364535 A1* | 12/2014 | Chatterji | C09K 8/473 523/130 |
| 2015/0107835 A1* | 4/2015 | Panga | E21B 43/267 166/280.1 |
| 2015/0240612 A1* | 8/2015 | Fu | C09K 8/72 166/308.1 |

FOREIGN PATENT DOCUMENTS

| | | | | |
|---|---|---|---|---|
| WO | 2007086771 A1 | 8/2007 | | |
| WO | 2011081546 A1 | 7/2011 | | |
| WO | 2011145966 A1 | 11/2011 | | |
| WO | 2012025805 A2 | 3/2012 | | |
| WO | WO-2014042551 A | * 3/2014 | ............... | C09K 8/70 |

OTHER PUBLICATIONS

International Search Report and Written Opinion issued in International Patent Appl. No PCT/RU2016/000050 dated Nov. 3, 2016; 7 pages.

* cited by examiner

POLYMER FIBER ADDITIVE FOR PROPPANT FLOWBACK PREVENTION

BACKGROUND

Hydrocarbons (oil, natural gas, etc.) are obtained from a subterranean geologic formation (i.e., a "reservoir") by drilling a well that penetrates the hydrocarbon-bearing formation. The well provides a partial flowpath for the hydrocarbon to reach the surface. Production of the hydrocarbons which involves travel of the hydrocarbons from the formation to the wellbore (and ultimately to the surface), occurs when a sufficiently unimpeded flowpath from the formation to the wellbore is present.

Hydraulic fracturing, also referred to as fracking, is a primary tool for improving well productivity by creating or extending fractures or channels from the wellbore to the reservoir. Pumping of propping granules, or proppants, during the hydraulic fracturing of oil and gas containing earth formations may enhance the hydrocarbon production capabilities of the earth formation.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for fracturing a subterranean formation that includes injecting a fracturing fluid into a wellbore through the subterranean formation, thereby creating a fracture network in the subterranean formation, the fracturing fluid including a proppant and a plurality of polymer fibers having a deflection temperature ranging from about 70° C. to about 150° C. dispersed in a carrier fluid.

In another aspect, embodiments of the present disclosure relate to a method for fracturing a subterranean formation that includes pumping a first slurry into a wellbore through the subterranean formation to initiate and/or propagate a fracture, the first portion of the slurry including a proppant and a first plurality of polymer fibers dispersed in a carrier fluid, pumping a second slurry into the wellbore, the second slurry including the proppant and a second plurality of polymer fibers having a deflection temperature ranging from about 70° C. to about 150° C. dispersed in the carrier fluid and allowing the fracture to close.

Other aspects and advantages of the claimed subject matter will be apparent from the following description and the appended claims.

DETAILED DESCRIPTION

Generally, embodiments disclosed herein relate to polymer fibers and fracturing methods of using the same for preventing proppant flowback. More specifically, embodiments disclosed herein relate to fracturing fluids formed of a proppant and a plurality of polymer fibers dispersed in a carrier fluid that may prevent, minimize, or reduce the flow of both deposited proppant and natural formation particulates back through the wellbore with the production of formation fluids. The inventors of the present disclosure have found that the presence of polymer fibers having a deflection temperature ranging from about 70° to 150° C. in the fracturing fluid may allow for the formation of a porous pack that includes proppant particles and polymer fibers. This porous pack filters out unwanted particles, proppant and fines, while allowing production of oil and/or gas through the fracture.

In a fracturing method for a subterranean formation, a first stage referred to as the "pad stage" involves injecting a fracturing fluid into a wellbore at a sufficiently high flow rate that creates a hydraulic fracture in the formation. The pad stage is pumped until the fracture is of sufficient dimensions to accommodate the subsequent slurries pumped in the proppant stages. After the "pad stage", several stages referred to as "proppant stages" or "propped stages" are injected into the formation, in which solid proppant particles are suspended in the fluid. While conventional fracturing techniques may include the continuous introduction of proppants (shown in FIGS. 1-2 below), embodiments also include the periodic introduction of proppants (shown in FIGS. 3-4).

Figure 1:
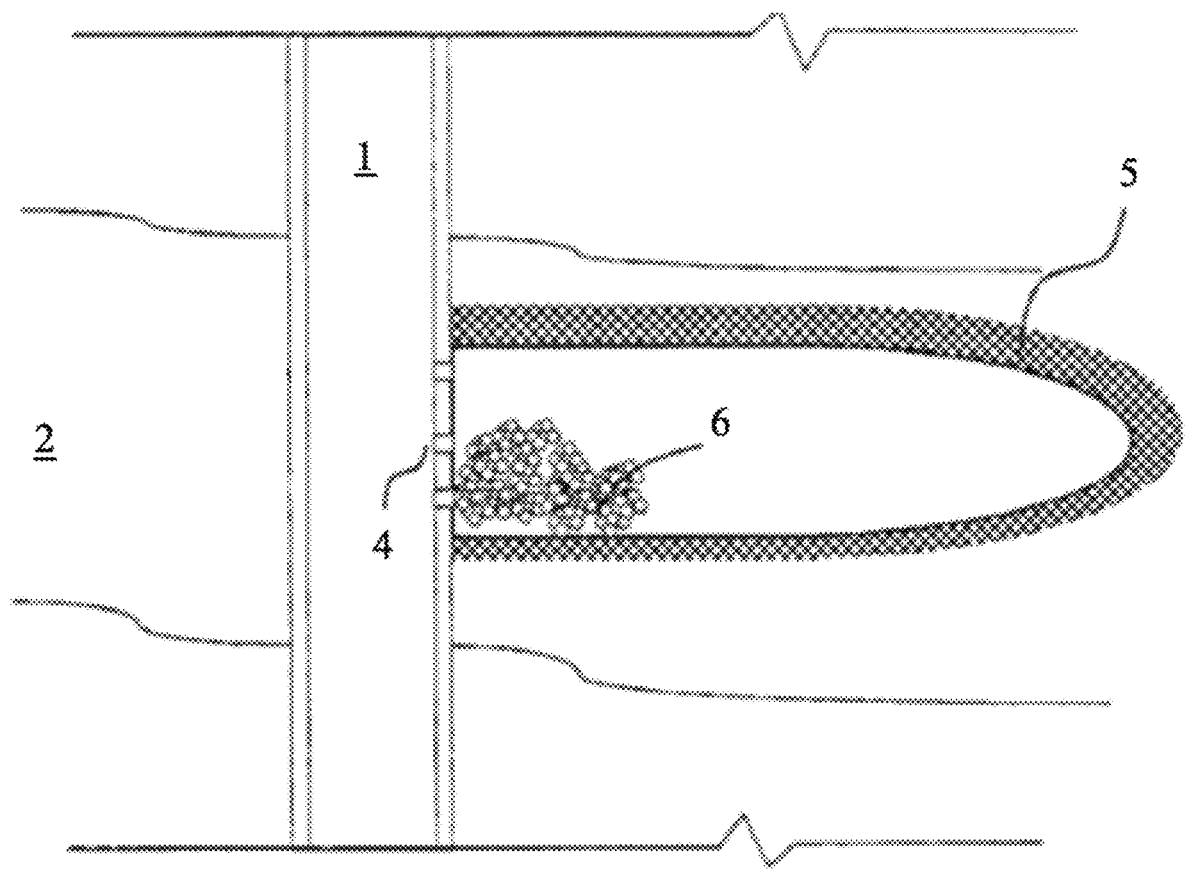
FIGS. 1 and 2 show the proppant distribution following a fracturing treatment.
Figure 2:
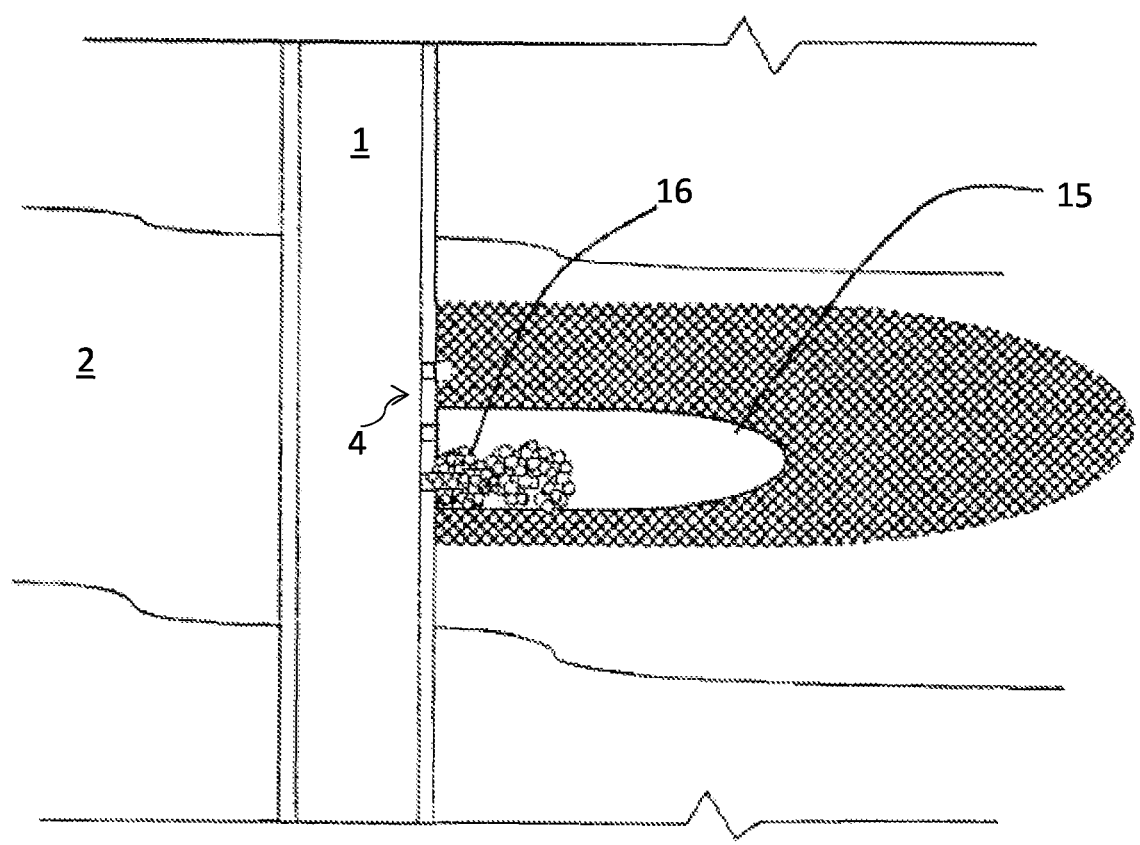

As shown in FIG. 1, hydraulic fracturing injects a fluid (such as a viscous carrier fluid) (not shown), a portion of which may contain suspended proppant, into a wellbore 1 penetrating an oil and gas bearing earth formation 2 and forcing the fracturing fluid through perforations 4 against the formation strata by pressure, which results in the creation or growth of a fracture network (not shown) within the earth formation 2. The fracture 5 serves as conduits for the flow of hydrocarbons trapped within the formation 2 to the wellbore 1. To keep the fractures 5 open and capable of supporting the flow of hydrocarbons to the wellbore 1, proppants 6 are delivered to the fracture 5 within the formation by a carrier fluid and fill the fracture 5 with a proppant pack (such as 16 as seen in FIG. 2) that is strong enough to resist closure of the fracture 5 from formation pressure and is also permeable for the flow of the fluids within the formation. After the proppant is placed in the fractures, the pressure is released, and the fracture 5 is allowed to shrink (or close) with the formation of fracture 15 as shown in FIG. 2, whereby conductive proppant packs (such as 16 as seen in FIG. 2) are formed in the fractures through which formation fluids can be produced at sufficiently high rates.

Figure 3:
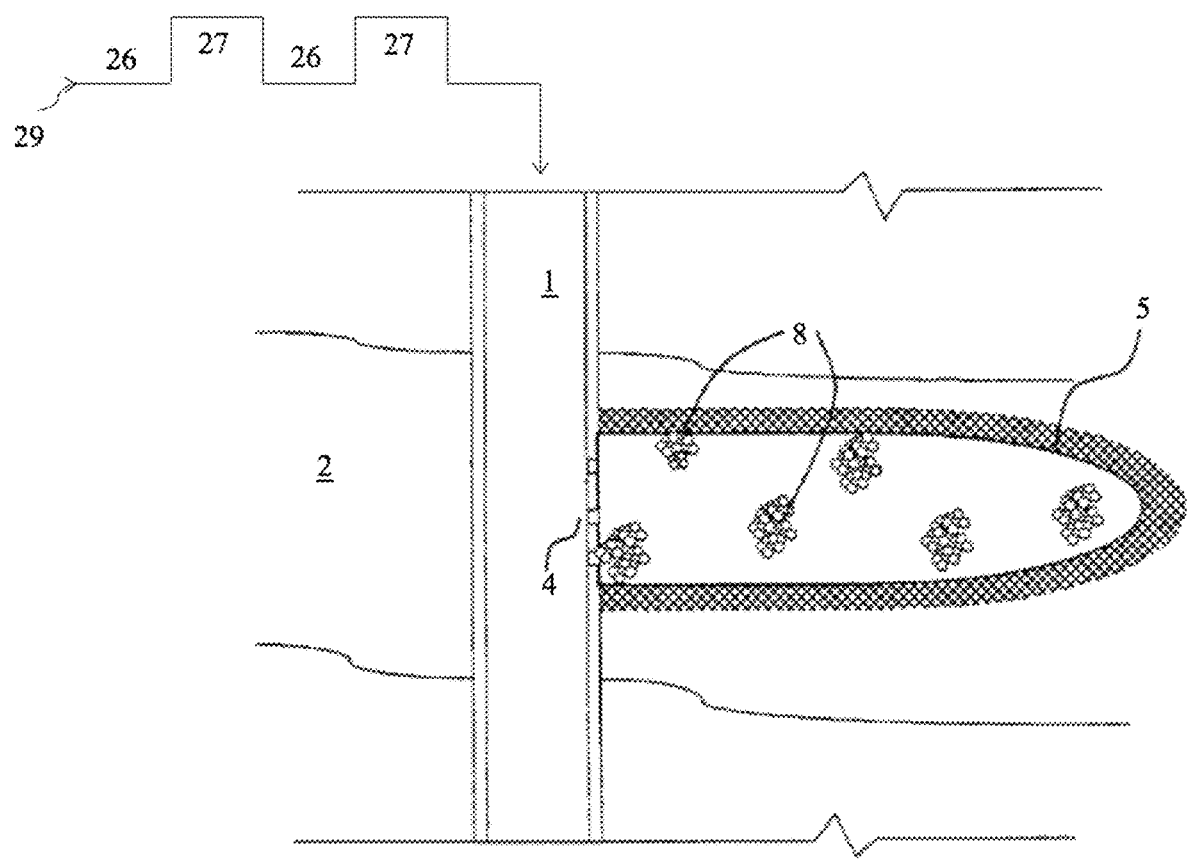
FIGS. 3 and 4 show the proppant distribution as a result of alternating proppant fluid-stage.

Referring now to FIG. 3, a heterogeneous proppant placement in a fracture is shown. As seen in FIG. 3, a wellbore 1 can be completed with perforations 4 in the formation 2. Proppant materials may be intermitently injected into the same fracturing fluid 29 through the wellbore 1 into a fracture 5. The fracturing fluid has sufficient viscosity to suspend the proppants during injection and heterogeneously place them in bundles of proppant or proppant cluster 8 spread along the fracture. In one or more embodiments, the proppant clusters 8 may be separated by channelant-rich regions (not shown) which may be removed, after the fracture is allowed to close, by various methods such as flushing, dissolving, softening, melting, breaking, etc.

Figure 4:
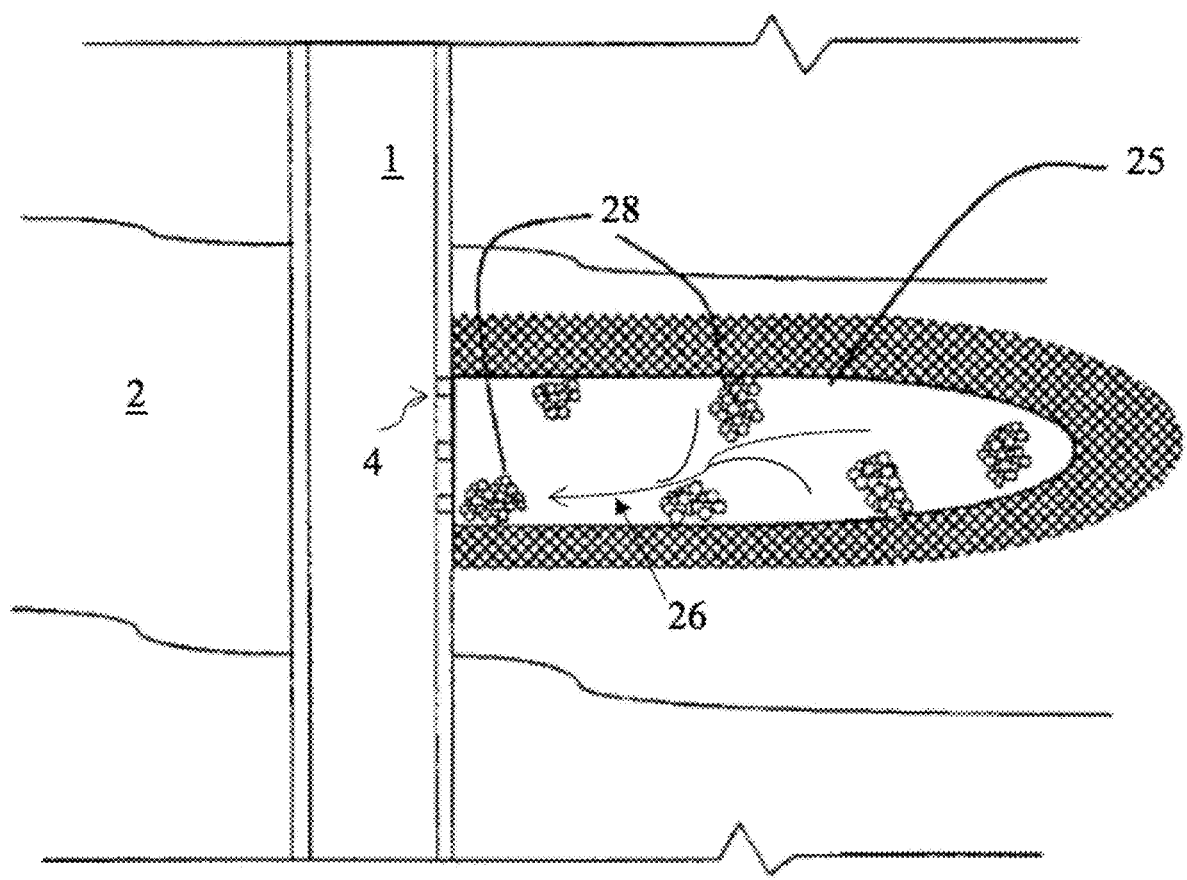

Referring still to FIG. 3, the clusters 8 of proppant are spread out along a large fraction of the fracture length. Upon closing of fracture 5, the proppant clusters 8 compress to form pillars 28 to support the fracture 25 (as shown in FIG. 4) and prevent the opposing fracture faces from contacting each other, creating higher overall conductivity and effective fracture half-length. As a result, when the pressure is released, the clusters 28 remain spread along the whole fracture and minimize the shrinkage of the fracture 25. Next, the formation fluid may be allowed to invade (not shown) the fracture 5 to displace any channelant, or any unconsolidated proppant or other particles from the proppant-lean regions. A network of interconnected open channels 26 can thus be formed around the pillars 28 to provide the fracture 25 with high conductivity for fluid flow. The fluid systems can be alternated many times to achieve varied distribution of the clusters in the hydraulic fracture. By sequentially injecting into the wellbore alternate stages of fracturing fluids having a contrast in their ability to transport propping agents to improve proppant placement, or having a contrast in the presence or amount of transported propping agents, the well productivity is increased.

The general concept of "pulse fracturing" will now be described. In such embodiments, a proppant stage 29 (as shown in FIG. 3) involves the periodical introduction of proppants into the fracturing fluid to form a suspension. Thus, the propped stage may be divided into two periodically repeated sub-stages, the "carrier sub-stage" or the "clean pulse" 26 that involves injection of fracturing fluid without proppant, and the "propping sub-stage" or the "dirty pulse" 27 that involves addition of proppant into the fracturing fluid. As a result of the periodic slugging of slurry containing proppant, the proppant does not completely fill the fracture. Rather, spaced proppant clusters 28 (as shown in FIG. 4) form as posts or pillars with channels 26 between them for fluids to pass between the pillars. The volumes of dirty pulse 27 and clean pulse 26 as pumped may be different, or may change over time.

Ideally, upon release of the pumping pressure, the proppant materials used in the fracturing fluid may remain in the fractures, holding the separated rock faces in an open position and forming a channel for flow of formation fluids back to the wellbore. However, if the proppant pack includes or develops voids or channels therein, proppant flowback with produced fluids may take place. Proppant flowback typically occurs instantly during well cleanup or over a period of several days to weeks or months after the fracturing treatment, but it can also start anytime during the economic life of the well. Proppant flowback often leads to poor fracture conductivity in the near wellbore zone. This is caused by the reduction in the fracture width which limits the production from the entire fracture. Proppant flowback may also have a detrimental effect on the production equipment leading to plugging or erosion of the surface equipment which results in loss of revenue during downtime when equipment is replaced.

Thus, the fracturing methods of the present disclosure involve the use of polymer fibers to reinforce the proppant pack and to prevent, minimize, or reduce the proppant flowback. According to the present disclosure, the fracturing treatment may be performed for example as described above in FIG. 1-2 or 3-4. Specifically, according to the present embodiments, a fracturing fluid including a proppant and a plurality of polymer fibers may be injected into a wellbore through the subterranean formation to create a fracture network in the subterranean formation. The fractures into which the plurality of polymer fibers are injected may have been opened by a prior fracturing fluid that is injected at a sufficient rate and pressure into the wellbore to initiate and/or propagate at least one fracture in the subterranean formation. However, it is within the scope of the present disclosure that the present fluid containing the polymer fibers is used at such stage as well. The proppant and the plurality of polymer fibers are suspended in a portion of the fracturing fluid, so that the proppant and the polymer fibers are placed in the formed fracture in a subterranean zone, while maintaining the fracture open. Thereafter, the fracturing fluid flow and pressure exerted on the fractured subterranean zone are terminated whereby the fractures are allowed to close on the proppant and polymer fibers. The polymer fibers entrap the proppant particles, facilitating the formation of permeable proppant packs. The suspension of the proppant and polymer fibers in the fracturing fluid may be accomplished by utilizing conventional batch mixing techniques to mix and suspend the proppant and the polymer fiber. It is also envisioned that the polymer fibers may be added into the fracturing fluid on-the-fly, right before the injection of the slurry into the well.

As noted above, the pumping of the fracturing fluid may be performed at a constant pumping rate or by pumping with pulses (such as described in FIGS. 3 and 4 above). In embodiments where the fracturing fluid is pumped with pulses, the dirty pulse 27 may include a slurry containing proppant and a plurality of polymer fibers while the clean pulse 26 may contain the fracturing fluid (free of proppants and polymer fibers). In such embodiments, the polymer fibers may be included in the fracturing fluid 29 at the beginning, middle and/or the end of a dirty pulse 27. It is also envisioned that both the clean pulse and dirty pulse may contain polymer fibers in differing concentrations, materials, etc. to differentiate between the two at the end of the fracturing job.

According to various embodiments, the proppant particles and the plurality of polymer fibers are dispersed in a carrier fluid, which may provide a uniform distribution of the proppant in the wellbore zone. Upon placement in the fracture and under downhole temperatures, the polymer fibers form a 3D fiber network that holds the proppant in place thereby limiting further proppant flowback with the fluid production, while allowing the formation fluids to flow. The polymer fibers act to bridge across constrictions and orifices in the proppant pack, and they serve to stabilize the proppant pack with no or minimal effect on proppant conductivity. Further, the fibers may allow for a uniform distribution of proppant throughout the fracture height, which may provide for a uniform distribution of stress on a proppant pack upon closure of the fracture, thereby fixing and immobilizing the proppant in the fracture.

Various polymer fibers may be used in a fracturing fluid in accordance with embodiments of the present disclosure. In one or more embodiments, the polymer fibers may have a deflection temperature (measured by ASTM D648, at a load of 0.46 MPa (66 psi)) ranging from about 70° C. to 150°

C. Such property stands in contrast, for example, to glass fibers. The deflection temperature is a measure of a polymer's ability to bear a given load at elevated temperatures. According to this test, the deflection temperature is the temperature at which a test bar of a given material, loaded to the specified bending stress, deflects by 0.010 inch (0.25 mm).

According to the present embodiments, the polymer fibers do not chemically interact with components of the well treatment fluids and are stable in the subterranean environment. Thus, in various embodiments, the fracturing fluids may include polymer fibers that are insoluble and/or non-degradable under downhole conditions. It is also envisioned that non-stiff fibers (flexible fibers) may be used in fracturing. Further, to allow for ease in pumping downhole, the fibers may be flexible, or at least flexible at the selected geometry.

Stiffness is proportional to the Young's modulus of a fiber, and is generally known as the resistance to deformation. Fiber stiffness is one of the main characteristics affecting fiber performance. Suitable stiffness is a function of Young's modulus, length, and diameter (or longest cross-sectional dimension if not circular)—these factors may compensate for one another. For example, a low-Young's modulus fiber may be "stiff" if it has a sufficiently large diameter or is sufficiently short. Stiffness may be derived from formula (1):

$$S = \frac{Ed^4}{Wl^3} \quad (1)$$

where E is Modulus of Elasticity (Kg/mm$^2$), d is the fiber diameter (mm), W is the weight or force causing the deflection (grams), and 1 is the fiber length (mm). The deflection in a fiber (upon an applied load W) is proportional to 1/stiffness. A stiffness factor is defined as the ratio of the stiffness of a given fiber to the stiffness of a glass fiber having a Young's Modulus of 65 GPa, a 20 micron diameter and a length of 12 mm. According to the Handbook of Polypropylene and Polypropylene Composites, (2003), the Young's modulus (modulus of elasticity) of PP varies with the temperature. For example, it is 1.42 GPa at −40° C., 0.38 GPa at 20° C., 0.21 GPa at 80° C. and 0.12 GPa at 120° C. In one or more embodiments, the fibers of the present disclosure may be non-stiff, having a stiffness ratio of less than about 1 (i.e., less stiff than glass fibers). Further, in one or more embodiments, the modulus may range from about 0.1 GPa to about 1.5 GPa.

In one or more embodiments, the polymer fibers that have shown utility in the fracturing methods of the present disclosure may include fibers made of any non-degradable thermoplastic polymers or co-polymers or a combination thereof including polyesters, polyolefins, polyamides and polyaramides. For example, in one or more embodiments, the polymer fibers are non-degradable fibers that are insoluble under downhole conditions. In various embodiments, the fibers may contain one type of polymer. It is also envisioned that a blend of two or more polymers or copolymers or the like may be used to prepare the polymer fibers of the present disclosure. Such fibers may have a variety of cross-sectional shapes ranging from simple round cross-sectional areas, oval cross-sectional areas, trilobal cross-sectional areas, star shaped cross-sectional areas, rectangular cross-sectional areas (ribbons) or the like.

Figure 10:
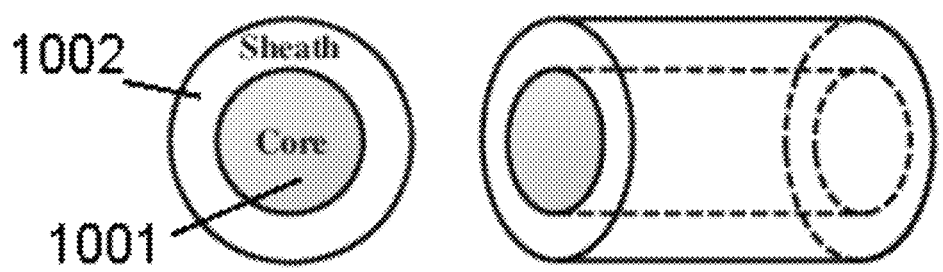
FIG. 10 shows a schematic diagram of a core/sheath fiber.

In some embodiments, the fibers may be bi-component fibers with a core/sheath coaxial structure, a bi-component fiber with a side-by-side, segment pie, island-in-the-sea structure, or any other multi-component fiber configuration. As used herein, the term "islands in the sea" denotes a type of bicomponent or multicomponent fiber also described as multiple interface or filament-in-matrix. The "islands" are cores or fibrils of finite length, of one or more polymers imbedded in a "sea" (or matrix) consisting of another polymer. The term "core/sheath" as used herein denotes a bi- or multicomponent fiber of two polymer types or two or more variants of the same polymer. In a bi-component core/sheath fiber, one polymer forms a core 1001 and the other surrounds it as a sheath 1002 (FIG. 10). Multicomponent core/sheath type fibers or two or more polymers can also be made, containing a core, one or more inner sheaths, and an outer sheath. In a multi-component fiber configuration, the components may be a combination of degradable and non-degradable thermoplastic polymers or co-polymers or a combination thereof including polyesters, polyolefin, polyamides, polyaramides or the like. Even if degradable polymers may degrade with time at elevated temperature in the presence of water, they may provide additional properties such as reduced friction. For example, flowback tests (not shown) performed on PLA/PE fibers with a core/sheath composition showed good results even though PLA (poly-lactic acid) fibers degrade in time at elevated temperatures in the presence of water.

The fibers that have shown particular utility in the wellbore fluids of this disclosure are single-component polyolefin fibers (such as for example, polypropylene (PP) or polyethylene (PE) fibers) which have long term application (from 6 months and longer) at temperatures up to about 93° C. (200° F.) or even 110° C. (230° F.). In one or more embodiments, such fibers may have a simple round cross section. According to various embodiments of the present disclosure, polymer fibers may be polypropylene having a melting temperature ranging from 150° C. to 180° C. and a degree of crystallinity ranging from 30% to 100%, which may allow for fiber stability in formation fluids at elevated temperature (in terms of resistance to dissolution in hydrocarbons). Other embodiments may include polyethylene fibers having a melting temperature ranging from 110° C. to 135° C. and a degree of crystallinity ranging from 30% to 100%.

According to various embodiments, the geometry (length and diameter) of the fibers disclosed herein are variables in preventing the proppant flowback. The polymer fibers that have shown utility in the present disclosure have a diameter that may range from 6 to 100 microns and a length that may range from 4 mm to 60 mm, where the lower limit of the diameter can be any of 6 microns, 10 microns, 12 microns, 15 microns and the upper limit can be any of 18 microns, 35 microns, 45 microns and 60 microns, where any lower limit can be used with any upper limit. In such an embodiment, the lower limit of the fiber length may range from 4 mm, 6 mm, 10 mm, 15 mm and the upper limit can be any of 18 mm, 30 mm, 40 mm and 60 mm, where any lower limit can be used with any upper limit. Further, as mentioned above, the size (length and diameter) may be selected, in part, based on the desired stiffness, and may vary depending on the Young's modulus for a given materials to arrive at the desired stiffness.

Due to their flexibility and proper geometry (length and diameter) the fibers can be easily pumped at any stage of fracturing job with the existing pumping equipment and may provide the proper stability of the proppant pack. It is also envisioned that the fibers may be pumped in the last stage of a fracturing stage called "tail-in". The previous "proppant stages" may be pumped with proppant alone (conventional fracturing job) or together with degradable fibers. In such embodiments, the degradable fibers may be, for example, polylactic acid (PLA) fibers or polyethylene terephthalate (PET) fibers; however, other degradable fibers may be used as well. In embodiments where the fibers of the present disclosure are preceded by proppants pumped with degradable fibers, the pumping of the proppant/degradable fiber fluid may be performed at a constant pumping rate or by pumping with pulses (such as described in FIGS. 3-4 above). The "tail-in" stage may be pumped at a constant pumping rate to prevent "fracture pinching" at perforation. The "tail-in" stage (thus, the fluid having the polymer fibers of the present disclosure therein) may be pumped using a cross-linked gel, but it may also be performed using a linear gel or other carrier fluids. The concentration of proppant in the "tail-in" stage (with the fibers of the present disclosure) can vary from well to well, such as from 4 pounds of proppant added to one gallon of fluid (ppa) to 16 ppa or from 6 ppa to 8 ppa. In one or more embodiments, the concentration of the non-degradable and insoluble fibers of the present disclosure in the "tail-in" stage may be in the range 0.4-5% by weight of proppant (BWOP), where the lower limit can be any of 0.4, 0.6, 0.8 or 1.0% by weight of proppant, and the upper limit can be any of 1.0, 1.2, 1.25, 2.0, or 3.0% by weight of proppant, where any lower limit can be used with any upper limit.

According to various embodiments, the polymer fibers may be mixed throughout the entire batch of proppant to be pumped during the stage or job. This may be accomplished by adding the polymer fibers to the proppant before it is mixed with the fluid, adding the polymer fibers to the fluid before it is mixed with the proppant or by adding the polymer fibers dispersed in a carrier fluid at some other stage, before the slurry is pumped downhole. For example, as noted above, polymer fibers may be pumped along with the proppant and the fracturing fluid in the form of a suspension at a "tail-in" stage. For example, such stage may be defined as the last 10-25% of the total amount of proppant that is pumped into the fracture as a "tail-in" to control flow back in the most economical manner or for other reasons. In one or more embodiments, so-called slugs of proppant and polymer fibers and slugs of polymer fibers alone may be pumped "tail-in" without pulses to obtain a continuous proppant pack. Without being bond by the theory, it is believed that the continuous proppant pack may work as a filter for fines such as small particles which are crashed proppant or unconsolidated formation rock. In such embodiments, the continuous proppant pack pumped in a "tail-in" fashion may pinch the fracture in the near wellbore area.

It is also envisioned that small slugs of the fracturing fluid including proppant and polymer fibers may be pumped in between slugs of slurry of proppant or that small slugs of a slurry of polymer fiber alone (without proppant) may be pumped between slugs of the proppant slurry. This could conceivably be used to control flow dynamics down the fracture, for example by providing more plug flow-like behavior. Pumping of small slugs of slurry of fiber as the "tail-in" is one example of this general procedure, which also and/or instead may be performed at a prior stage in the fracturing.

Further, as discussed above, in various embodiments, in the initial fracturing stages, a prior fracturing fluid that may include or be free of a proppant (and optionally free of the polymer fibers of the present disclosure) may be pumped in the wellbore with the formation of at least a fracture. In the later stages of the fracturing treatment, a fracturing fluid including proppant and polymer fibers may be pumped continuously. It is also envisioned that a third slurry formulation, such as having proppant and a degradable polymer fiber, may also be used between the initial fluid and the tail-in fluid that contains the polymer fibers of the present disclosure. As noted above, embodiments of the present disclosure may involve the use of proppants in fracturing treatments when the proppant may be pumped continuously, or sequentially.

Another feature of the fibers is the reduction of the proppant settling rate (sedimentation). Due to the unique property of the polymer fibers to prevent sedimentation of the proppant, they may provide a uniform distribution of the proppant throughout the fracture height, which comes into play in a "tail-in" stage. Thus, a uniform distribution of stress on a proppant pack after fracture closure is provided, so the proppant in the fracture is fixed and immobilized.

According to the present embodiments, a fracturing fluid may comprise a carrier fluid. Water and brine are the most commonly used carrier fluids. For example, hydraulic fracturing fluids of the present disclosure may be aqueous solutions containing a thickener, such as a soluble polysaccharide, to provide sufficient viscosity to transport the proppant. Typical thickeners are polymers, such as guar (phytogeneous polysaccharide), and guar derivatives (hydropropyl guar, carboxymethylhydropropyl guar). Other polymers and other materials, such as xanthan, scleroglucan, cellulose derivatives, polyacrylamide and polyacrylate polymers and copolymers, viscoelastic surfactants, and the like, can be used also as thickeners. For example, water with guar represents a linear gel with a viscosity that increases with polymer concentration. Cross-linking agents are used which provide engagement between polymer chains to form sufficiently strong couplings that increase the gel viscosity and create visco-elasticity. Common crosslinking agents for guar include boron-, titanium-, zirconium-, and aluminum-laden chemical compounds.

Proppants may comprise naturally occurring sand grains or gravel, man-made or specially engineered proppants, such as fibers, resin-coated sand, or high-strength ceramic materials, e.g. sintered bauxite. The proppant collects heterogeneously or homogenously inside the fracture to "prop" open the new cracks or pores in the formation. The proppant creates planes of permeable conduits through which production fluids can flow to the wellbore. By selecting proppants having a contrast in one of such properties such as density, size and concentrations, different settling rates will be achieved. The fracturing fluids are of high viscosity, and therefore capable of carrying effective volumes of proppant material.

One embodiment of the present disclosure involves a method for fracturing a subterranean formation. In one such an illustrative embodiment, the method involves injecting a fracturing fluid into the wellbore to initiate and/or propagate at least one fracture in the subterranean formation. Following the initiation of the fracture(s), a fracturing fluid including a proppant and a plurality of polymer fibers having a deflection temperature ranging from about 70° C. to 150° C. dispersed in a carrier fluid may be injected into the wellbore and fracture(s), thereby creating a fracture network. The fracture is allowed to close after injecting the fracturing fluid. In such embodiments, at least 50% of the proppant stays in a suspended state in the fracturing fluid in the fracture before the fracture closes. Due to the permeability of the proppant pack formed, hydrocarbons may be produced from the subterranean formation into the wellbore through the proppant pack following the completion of the fracturing process. During the production of the hydrocarbons, such production may be carried out at a constant and/or cyclic stress on the proppant pack.

It is also envisioned that combinations of polymer fibers with different properties may be formed to prevent the proppant flowback. For example, a method for fracturing a subterranean formation may include pumping a first slurry into a wellbore through the subterranean formation to initiate and/or propagate a fracture, the first portion of the slurry including a proppant and a first plurality of polymer fibers dispersed in a carrier fluid, pumping a second slurry into the wellbore, the second slurry including the proppant and a second plurality of polymer fibers having a deflection temperature ranging from 70° C. to 150° C. dispersed in the carrier fluid and allowing the fracture to close. As noted above, the fracture is allowed to close after injecting the fracturing fluid. In such an embodiment, the first plurality of polymer fibers includes degradable polymers, while the second plurality of polymer fibers may be non-degradable and/or insoluble under downhole conditions.

EXAMPLES

The following examples are presented to further illustrate the preparation and properties of the wellbore fluids of the present disclosure and should not be construed to limit the scope of the disclosure, unless otherwise expressly indicated in the appended claims.

Performance of the fibers in terms of proppant flowback control was tested on a Flowback Apparatus. This device includes a flowback cell, a hydraulic press equipped with heating plates to apply certain stress on piston of flowback cell and heat it, a water pump that pumps liquid with given flow rate through the cell, a water bath that provides water with given temperature to the water pump and a set of different sensors (thermocouples, pressure gauges and flowmeters) connected to a computer that allows for collection of the experimental data. In order to hold the tested slurry, the cell was equipped with meshes to collect sand or proppant washed out of the cell. Such test may be used to determine the stability limits of the pack. The moment of sand pack failure was considered as the point of losing the stability because of the formation of an end-to-end channel across the pack. Results of the test are presented in Linear Velocity (cm/sec) units, which is flowrate divided by the cross-section of the sand pack area.

Example 1

The influence of different polymer fibers on the proppant pack stability, as well as the resistance to flowback at constant stress was studied. Such a test shows stability of the fiber-sand pack at continuously increasing flowrate and a closure stress of 1000 psi.

The samples were prepared as follows: an amount of 1.80 g of fibers (as seen in Table 1) was uniformly suspended in 300 ml of a linear gel solution (5.40 g/L of guar gum in water) with the formation of a slurry. Then, 144 g of sand (Badger sand, 20/40 mesh size) was mixed with the slurry. Next, the excess of liquid gel was removed pressing out the suspension through a syringe equipped with a mesh. Afterwards, the composition of sand and fibers was manually distributed in the flowback cell and tested as described below.

The testing procedure included the following stages: 1) the slurry was loaded into the cell and leveled. 2) the cell was assembled and installed into the hydraulic press. 3) stress up to 1000 psi was applied onto the cell. 4) the cell was heated with 1° C./min heating rate up to 80° C. (176° F.). 5) maintain the system at this temperature for 1 h. 6) water (preheated at 80° C. (176° F.) was pumped with 0.5 L/min flowrate for 5 min to remove gel residue. 7) preheated water was pumped through the cell with constantly increasing flow rate from 0 to 30 L/min and ramp of 20 min. The pack collapsed before flowrate reached 15 l/min.

Figure 5:
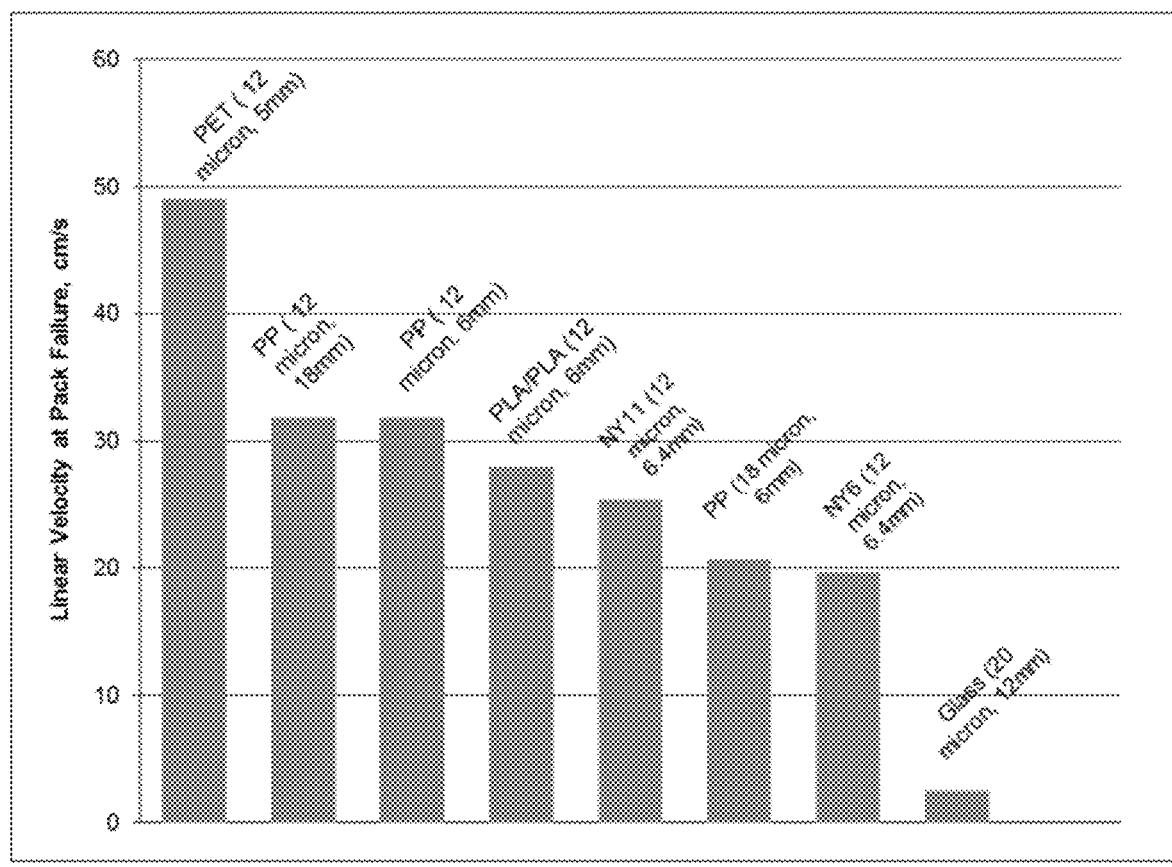
FIG. 5 depicts the influence of different fibers on the proppant pack stability and resistance to flowback at constant stress, according to the present embodiments.

As shown in FIG. 5, the test illustrates the advantage of using fibers which are made of polymers having a deflection temperature in the range 70° C. to 150° C. compared to glass fibers. In addition, the results show dependence of the flowback stability on the diameter of the fiber at a constant concentration of fibers (see PP 12 microns and 18 microns). The polymer fibers exhibited better results than the glass fibers. However, as seen in FIG. 5, Nylon, polyethyleneterephthalate (PET) and polylactic acid (PLA) fibers are less suitable for long term proppant flowback prevention operations as these polymers are prone to degradation in water (hydrolysis) under downhole conditions. In embodiments where it is desired for the flowback control additive to provide stability at downhole conditions for as long as possible, and at least several months, and not degrade under downhole conditions, a polyolefin, such as polypropylene (PP) or polyethylene (PE) may be used.

TABLE 1

| Name of material | Fiber diameter (micron) | Fiber length (mm) | $T_g$, (° C.) | $T_m$ (° C.) | T* deflect., (° C.) | Degradation in water at downhole temperature | Solubility in oil | Elongation at break, % |
|---|---|---|---|---|---|---|---|---|
| PP (isotactic) | 12-18 | 6-18 | −3 | 150-180 | 70-107 | non-degradable | Soluble at downhole temperature higher than 120° C. | 126-222 |
| Nylon-6 | 12 | 6.4 | 47-50 | 220 | 55-190 | degradable | insoluble | 35 |
| Nylon-11 | 12 | 6.4 | 42 | 190 | 40-47 50-54 145-149 | degradable | insoluble | 160-420 |
| PET | 12 | 5 | 69-115 | 265 | 115** | degradable | insoluble | 70 |
| PLA | 12 | 6 | 53-60 | 125-220 | 55-148*** | degradable | insoluble | 2-25 |
| Glass fibers | 20 | 12 | N/A | N/A | N/A | non-degradable | insoluble | 1-5 |

*Polymers: A Property database, Bryan Ellis, Ray Smith, CRC Press, Second Edition, 2008;
**Handbook of Thermoplastics, CRC Press, Second Edition, 2016;
***Handbook of Bioplastics and Biocomposites Engineering Applications, Wiley, 2011.

Example 2

The influence of PP fibers having different parameters on the proppant pack stability at a constant stress was studied. An amount of 1.40 g of fibers (see Table 1) was uniformly suspended in 121 ml of a linear gel solution (2.40 g/L of guar gum in water, 1.99 ml/L of clay stabilizer and 0.62 g/L of an oxidizing gel breaker with the formation of a slurry. Next, 175 g of sand (Badger sand, 20/40 mesh size) was mixed with the slurry. Afterwards, 0.73 ml of NaOH (15 g/L) solution and 0.24 ml of borate crosslinker were added simultaneously to the system under vigorous stirring. Next, the composition of sand and fibers was manually distributed in the flowback cell and tested in accordance to following procedure. The testing procedure included the following stages: 1) the slurry was loaded into the cell and leveled. 2) the cell was assembled and installed into the hydraulic press. 3) stress up to 1000 psi was applied onto the cell. 4) the cell was heated with 1° C./min heating rate up to 95° C. (203° F.). 5) the system was held at the temperature for 1 h. 6) water (preheated up to 95° C. (203° F.)) was pumped with 0.5 L/min flowrate for 5 min to remove gel residue. 7) preheated water was pumped through the cell with constantly increasing flow rate from 0 to 30 L/min and ramp of 20 min. The pack collapsed before the flowrate reached 15 l/min.

Figure 6:
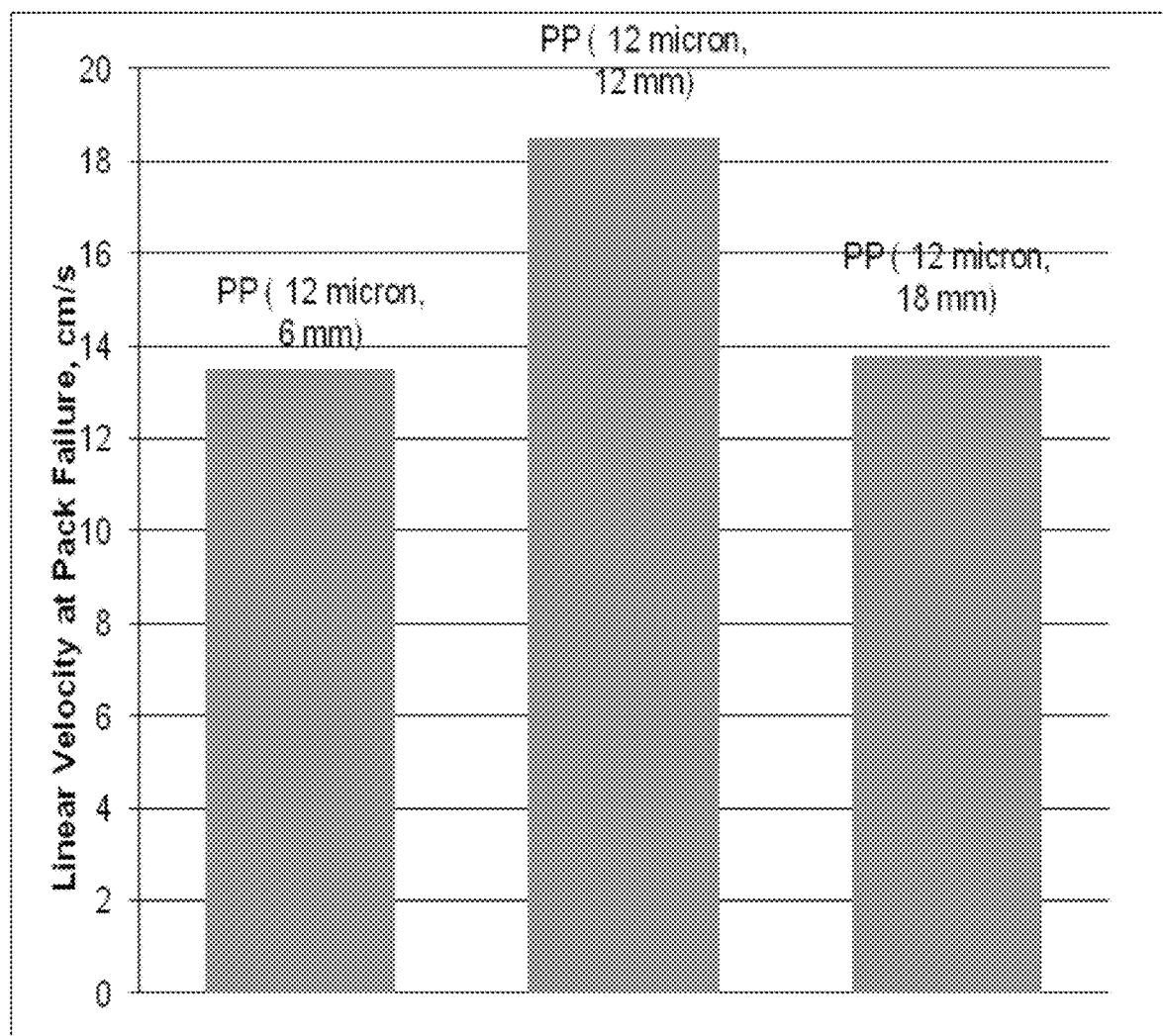
FIG. 6 shows the influence of PP fibers having different parameters on the proppant pack stability at constant stress, according to the present embodiments.

Referring now to FIG. 6, FIG. 6 shows the result of flowback parameters of fibers of different lengths which are made of the same material. According to the test results, the optimal length of fibers in terms of flowback properties is 12 mm. Fibers with a length of 18 mm and longer may cause greater problems during pumping. Without being bound by the theory, it is believed that this may be the reason of premature screen outs and surface equipment damage.

Example 3

Figure 7:
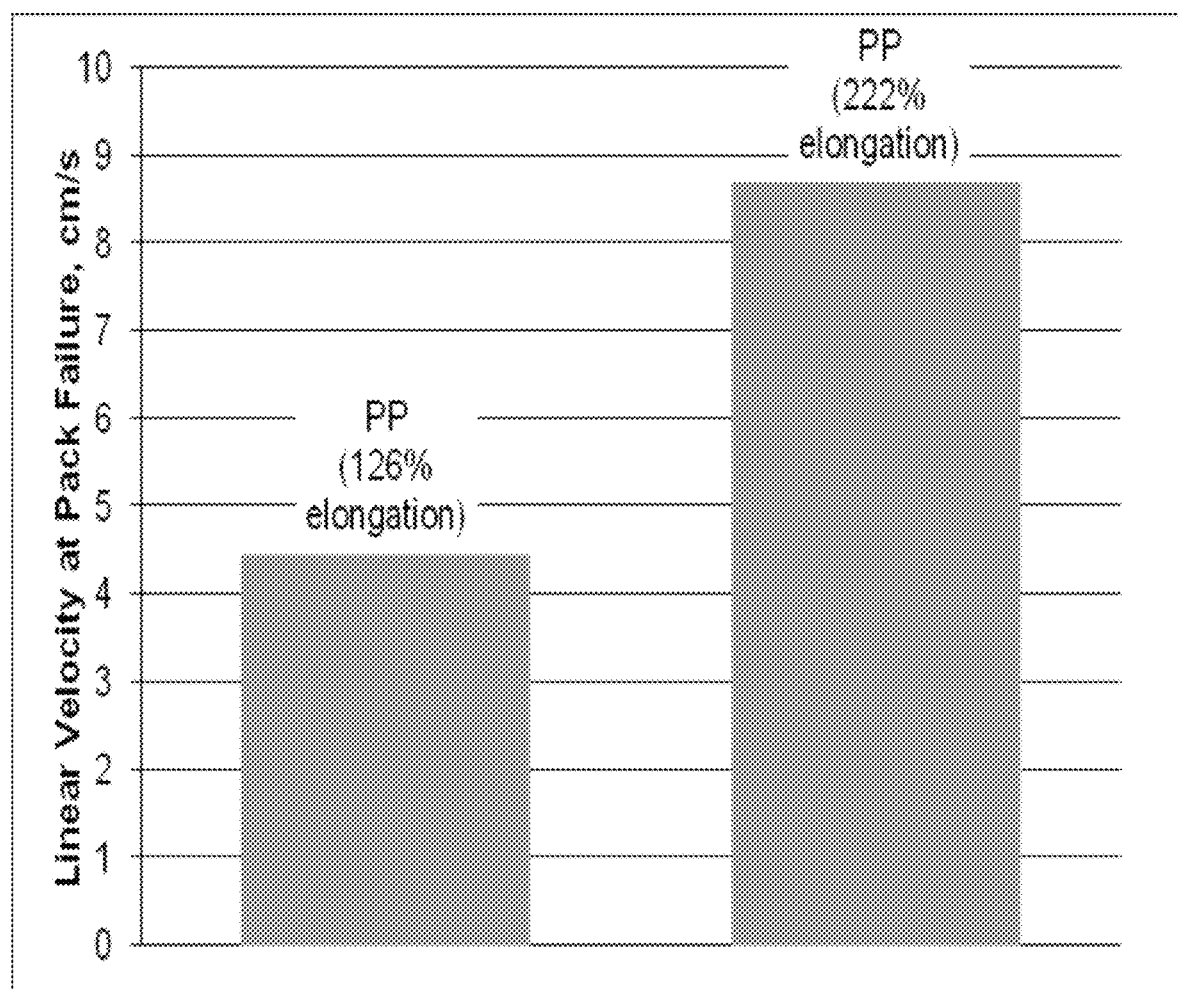
FIG. 7 shows the influence of PP fibers having different elongation at break on the proppant pack stability at constant stress, according to the present embodiments.

The influence of fibers on proppant pack stability at constant stress was performed by using PP fibers with different elongation at break. Samples were prepared and tested as described above in Example 2. Two fibers made of the same polymer (PP), having the same diameter and length, but with different elongation at break, were tested. The results of the tests are presented in FIG. 7. As seen in FIG. 7, fibers with higher elongation at break demonstrated almost twice the flowback strength. According to the manufacturer, differences in elongation at break were achieved by adjusting spinning line.

Example 4

The influence of the fiber on proppant pack stability under cyclic stress was studied. This test represents the advantage of using PP fibers over Resin Coated Sand (RCS) in terms of cyclic loading conditions. A resin coated sand SUPER LC™ 20/40 (produced by Fairmount Santrol) was chosen to compare properties of polymer fibers and RCS as a flowback preventer solution in cyclic stress conditions due to the fact that this is the most widely used 20/40 resin coated sand (~10% of the RCP/RCS market), where RCP is resin coated proppant. In order to avoid the influence of additional factors on the experiment, a resin coated sand with the same mesh size, roundness and sphericity as conventional sand was used. The procedure described above in Example 1 was used. Fibers were not added when RCS fibers was used. The testing procedure included the following stages: 1) the slurry was loaded into the cell and leveled. 2) the cell was assembled and installed into the hydraulic press. 3) stress up to 1000 psi was applied onto the cell. 4) the cell was heated with 1° C./min heating rate up to 95° C. (203° F.). 5) the system was held at the temperature for 1 h. 6) water (preheated up to 80° C. (176° F.) was pumped with 0.5 L/min flowrate for 5 min to remove gel residue. 7) water (preheated up to 80° C. (176° F.) was pumped with 7 L/min (18-27 cm/sec), as the linear velocity depends on the height of the proppant pack. 8) start the cyclic stress: 8.1) stress was increased up to 2000 psi with 100 psi/min rate. 8.2) the system was held at 2000 psi for 1 min. 8.3) pressure was reduced to 1000 psi with 100 psi/min rate. 8.4) the system was held at 1000 psi for 1 min. 9) 20 cycles were executed according to the schedule and the sand/proppant washed out was collected. The test was performed at 80° C. (176° F.) in the same conditions as described above for Example 1. The slurry was prepared as described above in Example 1. If a proppant pack is not destroyed during the cyclic stress, additional test to find limits of stability of the pack was performed according to the procedure described in Example 1.

Figure 8:
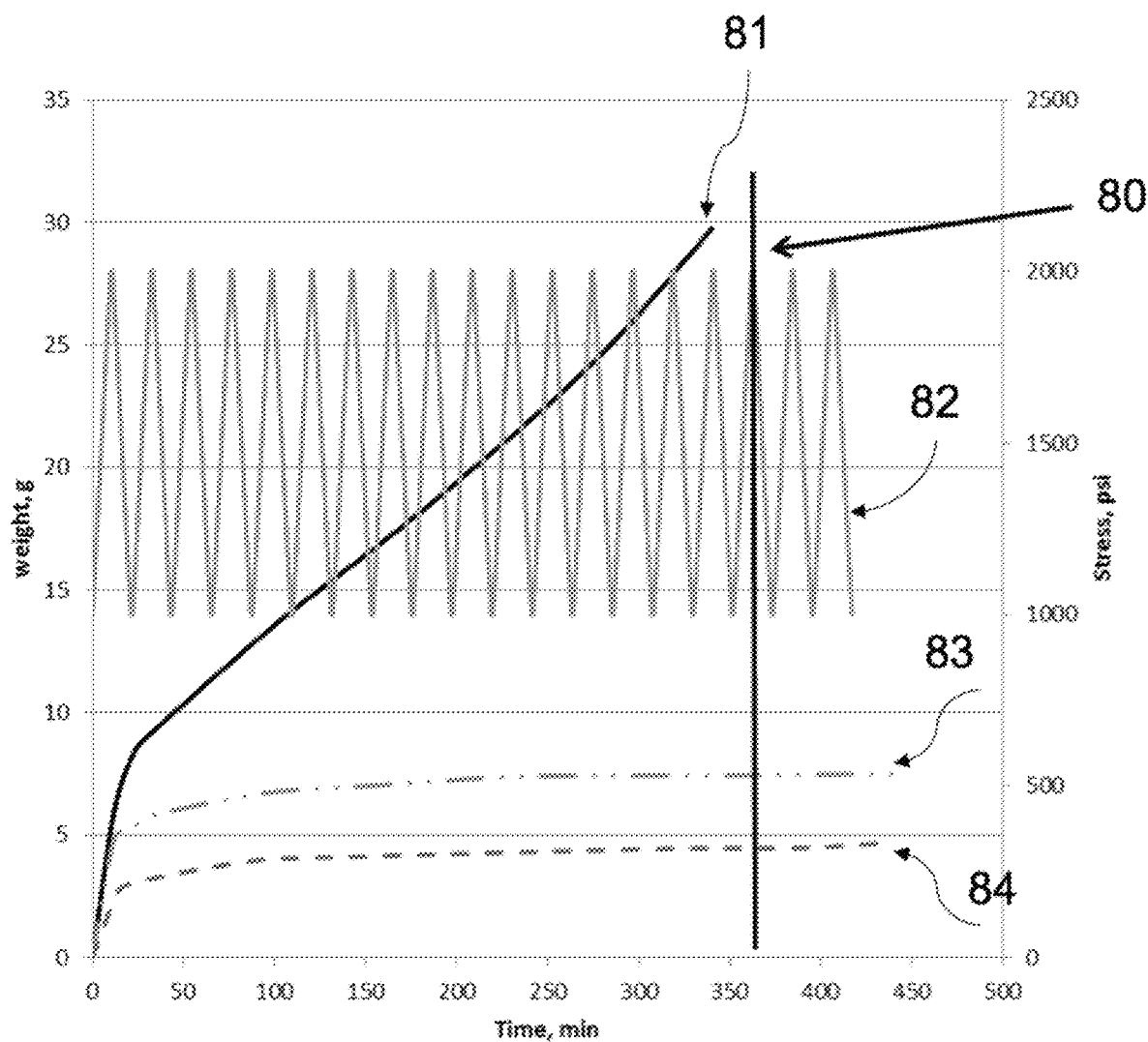
FIG. 8 shows the influence of fibers on the proppant pack stability at cyclic stress, according to the present embodiments.

Referring now to FIG. 8, the left y-axis of FIG. 8 depicts the total quantity of sand washed out by the cell vs. time. The right y-axis of FIG. 8 represents the stress on the cell. Concentrations of the fibers are given in % by weight of proppant (BWOP). Specifically, 81 represents RCS, SUPER LC™ 20/40, 83 represents PP (18 mm) 1.25% BWOP, 84 represents PP (12 mm) 0.8% BWOP and 82 represents the stress. The SUPER LC™ sand pack failure is represented as 80 in FIG. 8. As seen in FIG. 8, both fibers passed the test without destroying the fiber-sand packs. The total amount of sand that was washed out during the test was 4.7 g (3.3% of sand pack weight) in the case 12 mm PP fibers were used, and 7.5 g (5.9%) for 18 mm PP fibers. Most of this sand was washed out during the first 1.5 cycle-30 minutes of the experiment, namely 3.5 g (2.7%) and 5.8 (4.6%), respectively. After completing 20 cycles, both fiber-sand packs were exposed to the failure test in accordance with the procedure described above in Example 1. Decompositions were reached at 30.1 cm/sec (12 mm PP) and 43.2 cm/sec (18 mm PP) which corresponded to the upper point of the packs strength. The RCS pack failed the test. Specifically, it was completely destroyed during the 17th cycle when it formed a continuous channel. Before the failure, more than 30 g (24%) of the sand had been washed out. Without being bound by theory, it is believed, based on the experimental data, that both fiber solutions are able to withstand multiple cyclic stress, whereas RCS proved its inability to resist the multiple stress.

Example 5

The polymer fiber performance in terms of proppant settling control was studied. Proppant settling control is one of the parameters that determines the proppant transport additives (for example, degradable polymer fiber additive, represented as 95 in FIG. 9), which are used in Fiber-FRAC™ and Hi WAY. The proppant settling control was tested as follows: an amount of 1.92 g of fiber was mixed with 400 ml linear gel (with 5.4 g/L of guar loading) in a Waring blender at 3000 rpm for 15 min. Next, an amount of 192 g of ceramic proppant CARBO PROP™ 12/18 were added and dispersed with an overhead mixer at 1000 rpm for 2 min. The resulted slurry was placed into a 500 mL graduated cylinder. Afterwards, pictures were taken periodically. Proppant settling (S, %) vs. time was calculated according to equation (2):

$$S(\%) = (100 \cdot V_{CF})/(V_{initial} - V_{100}) \tag{2}$$

where $V_{CF}$ represents the volume of clear fluid above the slurry, $V_{initial}$ is the initial volume of the slurry, $V_{100}$ represents the volume occupied by the proppant at 100% settling (volume of dry proppant, 95 ml).

Figure 9:
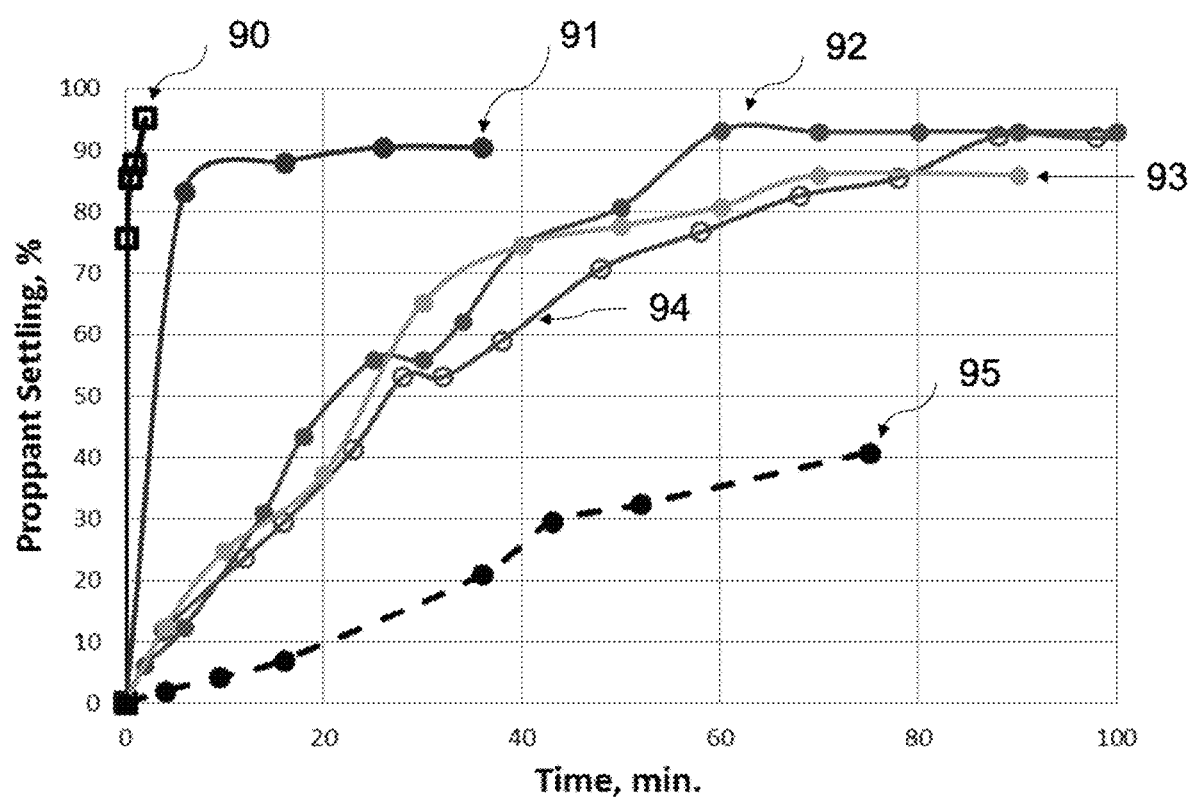
FIG. 9 shows the variation of the proppant settling in time for various fibers, according to the present embodiments.

Referring now to FIG. 9, FIG. 9 shows the performance results of PP fibers and bi-component fibers PP/PE core/sheath fibers (from different suppliers) in terms of proppant settling control. In addition, settling curves of glass reinforced polymer fibers (91) and glass fibers (90) are shown.

As it can be seen in FIG. 9, glass fibers (90) do not work as a proppant settling control additive as they are not able to sustain proppant in suspended state even for 1-2 minutes under the test conditions. Slightly better results were obtained in the case of sticky fibers (91), where about 90-100% of proppant settling occurred within 5-10 minutes. Polyolefin fibers PP (93) and PE/PP (92, 94) demonstrated good results. Specifically, 50% of the proppant settled for about 20 minutes. In the case of the fiber additive (95), especially designed for proppant transport, 50% of the proppant settled in about 90 minutes.

Example 6

The standard proppant settling test was conducted on an amount of 40 ppt polymer fibers and 4 ppa of CARBO PROP™ 12/18 in a linear gel with 5.4 g/L of guar loading (viscosity of 48-50 cPs at a shear rate of 511 s$^{-1}$ at room temperature (see Example 3).

Advantageously, embodiments of the present disclosure provide methods using polymer fibers for proppant flowback prevention. As described above, the polymer fibers create under downhole conditions a 3D fiber network that may incorporate the proppant particles.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A method for fracturing a subterranean formation, the method comprising: injecting a fracturing fluid into a wellbore through the subterranean formation, thereby creating a fracture network in the subterranean formation, the fracturing fluid comprising a proppant and a plurality of separate polymer fibers, the polymer fibers having a deflection temperature at a load of 0.46 MPa ranging from about 70° C. to about 150° C., dispersed in a carrier fluid, wherein the separate polymer fibers consist of polylactic acid/polyethylene core/sheath fibers or polypropylene/polyethylene core/sheath fibers, wherein the separate polymer fibers have sufficient flexibility to form a 3D network that holds the proppant in place.

2. The method of claim 1, further comprising: prior to injecting the fracturing fluid, injecting a second fracturing fluid to initiate and/or propagate at least one fracture in the subterranean formation; and allowing the fracture to close after injecting the fracturing fluid.

3. The method of claim 1, wherein the separate polymer fibers are non-degradable and/or insoluble under downhole conditions.

4. The method of claim 1, wherein the separate polymer fibers have a diameter ranging from about 6 microns to about 100 microns and a length ranging from about 4 mm to about 60 mm.

5. The method of claim 4, wherein the separate polymer fibers have a diameter ranging from about 10 microns to about 18 microns and a length ranging from about 6 mm to about 18 mm.

6. The method of claim 1, wherein at least 50% of the proppant stays in a suspended state in the fracturing fluid in the fracture before the fracture closes.

7. The method of claim 1, further comprising: producing hydrocarbons from the subterranean formation into the wellbore through a proppant pack including the plurality of separate polymer fibers, wherein the production of hydrocarbons is carried out at a constant and/or cyclic stress on the proppant pack.

8. A method for fracturing a subterranean formation, the method comprising: pumping a first slurry into a wellbore through the subterranean formation to initiate and/or propagate a fracture, the first slurry including a proppant and a first plurality of separate polymer fibers dispersed in a carrier fluid; pumping a second slurry into the wellbore, the second slurry including the proppant and a second plurality of separate polymer fibers, the second plurality of polymer fibers having a deflection temperature at a load of 0.46 MPa ranging from about 70° C. to about 150° C., dispersed in the carrier fluid; and allowing the fracture to close, wherein the second plurality of separate polymer fibers consists of polylactic acid/polyethylene core/sheath fibers or polypropylene/polyethylene core/sheath fibers, wherein the second plurality of separate polymer fibers have sufficient flexibility to form a 3D network that holds the proppant in place.

9. The method of claim 8, wherein the first plurality of separate polymer fibers are degradable polymers.

10. The method of claim 8, wherein the second plurality of separate polymer fibers are non-degradable and/or insoluble under downhole conditions.

11. The method of claim 8, wherein the second plurality of separate polymer fibers have a diameter ranging from about 6 microns to about 100 microns and a length ranging from 4 mm to 60 mm.

12. The method of claim 8, wherein at least 50% of the proppant stays in a suspended state in the fracturing fluid in the fracture before the fracture closes.

13. The method of claim 8, further comprising: producing hydrocarbons from the subterranean formation into the wellbore through a proppant pack including the plurality of separate polymer fibers, wherein the production of hydrocarbons is carried out at a constant and/or cyclic stress on the proppant pack.

* * * * *